Figure 1:
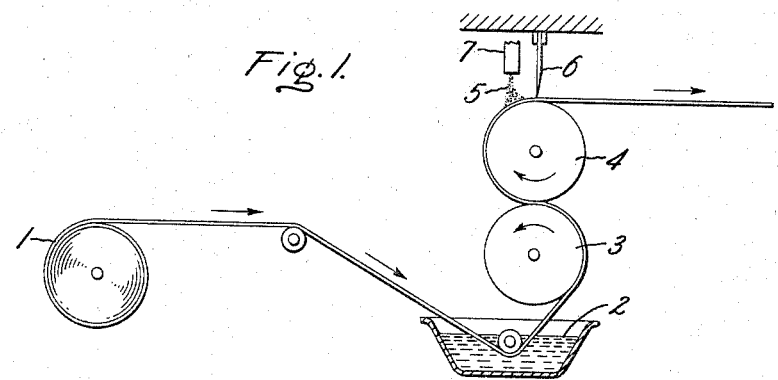

March 12, 1968  P. E. FUERST  3,373,071
LAMINATES
Filed March 26, 1964

OVERLAY 10
PRINT 9
CORE 8

COATING 13 RESIN, MICRO CRYSTALLINE CELLULOSE AND SILICA
PRINT 12
CORE 11

Inventor:
Peter E. Fuerst,
by
His Attorney.

United States Patent Office 3,373,071
Patented Mar. 12, 1968

3,373,071
LAMINATES
Peter E. Fuerst, Coshocton, Ohio, assignor to General Electric Company, a corporation of New York
Filed Mar. 26, 1964, Ser. No. 354,968
4 Claims. (Cl. 161—79)

This invention relates to laminates, to a process of preparing laminates and to surface coating compositions therefor. More particularly, the invention relates to laminates whose surface abrasion resistance is greatly enhanced by the use of a silica-containing surface coating composition and which have improved surface appearance.

Laminates having surfaces possessing a wide variety of desirable properties are well known. However, because of the increasingly widespread use of laminates in such applications as surfacing materials for counters, tables, desks, appliances, floors and other installations for both commercial and home use, the demands upon these laminates have become more and more exacting. No single property of the laminates is perhaps more vital than their wear or abrasion resistance and yet improvements in this property have stubbornly resisted solution. The principal reason for this resides in the multitude of seemingly inconsistent properties which the laminate surface must at one and the same time possess. Any improvement in abrasion resistance has almost always been accompanied by an adverse effect on one or more of the remaining properties of the laminate surface. A conventional laminate such as a decorative laminate comprises three essential properties: a wear surface layer, a print or pattern layer beneath the wear surface layer, and a core layer supporting the wear surface and print layers. In so far as the problem of abrasion resistance is concerned, the critical part of the laminate is, of course, the wear surface layer. This wear surface layer almost universally consists of a sheet of translucent overlay paper impregnated with a thermosetting resin, usually a melamine resin. This overlay paper is generally a very high quality thin sheet of paper manufactured from purified viscose, rayon fibers, cellulose fibers or other similar materials or from mixtures of the foregoing materials.

Siliceous materials have heretofore been used in coating compositions in general to improve abrasion resistance. However, if siliceous materials are incorporated in the coating composition used in the above described laminates, although improved abrasion resistance may be achieved, the result is generally a laminate with poor craze resistance, poor print clarity, surfaces which are brittle, or in many cases a combination of more than one of the foregoing deficiencies. Thus, attempts to use siliceous materials, including silica, silicates, glass fibers, clay, asbestos and the like, although successful in increasing abrasion resistance, are not successful to the extent that these materials have always resulted in adversely affecting one or more of the remaining properties of the laminate surface. One of the primary reasons for the foregoing difficulties has been found to reside in the fact that the overlay sheet prevents the homogeneous dispersion of the siliceous material in the resin, the overlay paper in effect acting as a filter for the siliceous material. After, for example, impregnating an overlay paper with a resin containing the finely ground silica flour, the impregnated overlay sheet contains a silica-rich resinous coating on the top and bottom surfaces and a silica-poor resinous composition in the middle. Actual abrasion tests on such a laminate have shown that the abrasion resistance is high on the top of the surface, becomes extremely low in the middle of the overlay and again becomes high on the bottom surface of the overlay. If finer silica than ground silica is used, for example, fumed silica or silica aerogel, in an attempt to obtain uniform distribution of silica within the overlay sheet, a coating problem is encountered. Then the coating composition becomes so viscous that the overlay paper simply will not pick up a sufficient amount of resin, that is, the resinous solution has such an extremely high viscosity that it will not soak into the overlay paper. According to copending application Ser. No. 32,653, filed May 31, 1960, now Patent 3,135,643 issued June 2, 1964 and assigned to the same assignee as this invention, there is provided a surface coating composition comprising a thermosetting resin, silica flour and a finely divided fibrous material in the form of discrete fibers having a refractive index approximating that of the cured thermosetting resin. This coating composition takes the place of the overlay paper, far and away improves the abrasion resistance of laminates to which it is applied, and constitutes a significant advance in the art of abrasion-resistant surfaces and abrasion-resistant laminates having such surfaces.

Certain decorative and other laminates, particularly those which are to be used on surfaces which reflect light, such as table or counter tops, floor surfaces, and the like, normally possess an undesirable gloss. It has become customary to reduce such gloss as by brushing the surface of the laminate as with brushes or wheels or pads having metallic or other abrading fibers alone or in conjunction with slurries of fine abrasive materials. It was found that when such gloss reducing treatment was applied to the above-mentioned prior art material having a surface layer containing silica and finely divided fibrous material in the form of discrete fibers, an undesirable mottle of unevenness in gloss or light reflection resulted which detracted from the esthetic value of the laminate and its marketability, particularly in the case of decorative laminates which are viewed from different angles and under varying light conditions.

A primary object of this invention is to provide laminates having superior abrasion resistance and which at the same time after treatment to reduce glare are characterized by even gloss or lack of mottle over their entire surface.

It has been found that other objects and advantages of the invention may be achieved by the elimination of the overlay paper from the surface of the decorative laminate and substituting for the overlay paper a composition comprising a thermosetting resin, silica flour and a finely divided microcrystalline cellulose material having a refractive index which is substantially identical with that of the cured thermosetting resin. With the use of the microcrystalline cellulose material in place of the above-mentioned fibrous material, the difficulties encountered above, including mottle or variations in gloss, can be overcome and a silica-containing coating composition can be used which not only improves the abrasion resistance of the laminate but also improves the mottle as well as the clarity stain resistance and print definition of the wear surface.

The microcrystalline cellulose material used herein is less in cost than the overlay paper previously employed, and compares favorably with the cost of the fibrous material mentioned above, and moreover labor costs involved in handling the overlay are eliminated. The invention additionally enables the use of a smaller total quantity of resin than with overlays since less resin is needed to impregnate the print sheet. In the preparation of standard decorative laminates, a higher proportion of resin than actually necessary was normally used for the overlay impregnating step because some of this resin often migrates into the print sheet. In the preparation of the laminates of this invention, less flow takes place from the coating composition into the print sheet. As a result, in spite of the utilization of a smaller total resin quantity, a larger proportion of resin remains in the wear surface where it is most needed. It is desirable to have a larger resin quantity in the wear surface of the laminate because the resin itself has greater intrinsic wear resistance than even overlay paper or the finely divided microcrystalline cellulose material used herein. Furthermore, the intrinsic abrasion resistance of the resin-silica combination is higher than the abrasion resistance of the resin itself. Hence, the final surface wear layer resulting from this invention has very high intrinsic abrasion resistance together with substantial thickness.

Before one can grasp the full importance of the present invention, the function of the overlay paper in standard decorative laminates must be understood. The overlay sheet consists of overlay paper impregnated with a wear surface layer of resin. The overlay paper used in conventional laminates serves four essential functions. (1) Primarily, the overlay acts as a carrier for the resin of the wear surface layer. This function is primarily a handling or processing function, that of a mechanical carrier of the resinous material. (2) The overlay paper also acts as a flow restricter. The fibers of the overlay paper function to restrain the flow of the surface coating resin to prevent, as much as possible, resin flow down into the print sheet. A certain minimum amount of resin must stay on top of the print sheet so that a proper distribution of resin on the surface results. (3) A third function of the overlay is that it acts as a shim by maintaining a certain essential thickness of the surface layer above the print sheet (ordinarily from 2 to 3 mils). The overlay plus resin can only be squeezed or compressed to a certain thickness, depending, of course, upon the pressure used and the density of the overlay sheet. If a thickness of 3 mils is desired, then a certain thickness and density of overlay sheet is employed to give this thickness. (4) The fourth function of the overlay paper is that of reinforcement. The use of a resin alone will result in a surface which is crazed or cracked. If an overlay paper is used together with the resin, the fibers of the overlay paper keep the resin together so that crazing or cracking of the resin is prevented.

It has been found that the above four functions may be carried out by using, in place of the overlay sheet, a surface coating composition containing finely divided microcrystalline cellulose material. The use of such a surface coating composition permits the incorporation of an abrasion-resistant material into the surface coating composition without deleterious side effects.

Briefly stated, the surface coating compositions of this invention comprises a thermosetting resin, silica and a microcrystalline cellulose material having a refractive index approximating that of the thermosetting resin, said composition being clear and highly translucent in its cured condition. The process of this invention involves the steps of coating a thermosetting resin impregnated print sheet with the above surface coating composition comprising a thermosetting resin, silica and a finely divided microcrystalline cellulose material having a refractive index approximating that of the cured thermosetting coating resin. The impregnated and coated print sheet is then dried and a conventionally prepared core stock, in sheet form, is stacked in layer form with the dried print sheet above the core stock. The separate sheets are then molded at elevated temperatures and pressures into a composite laminate.

Figure 2:
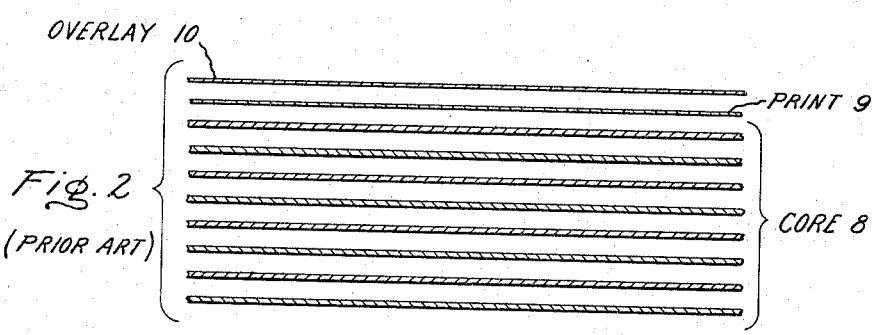
Figure 3:
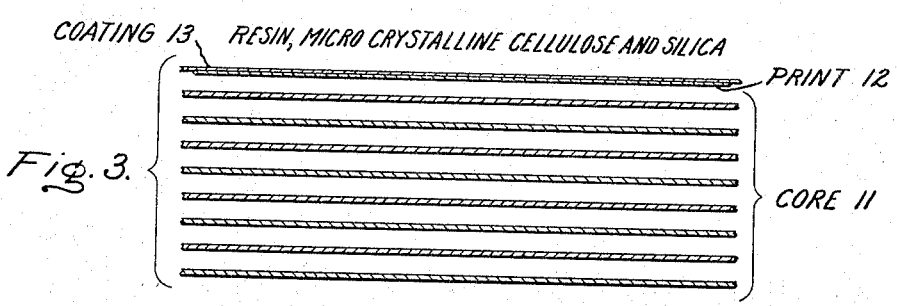

The features of the invention which are believed to be novel are set forth with particularity in the claims appended hereto. The invention will, however, be better understood and further advantages and objects thereof will be appreciated from a consideration of the drawing in which FIGURE 1 is a diagrammatic illustration of one means for impregnating and coating a wet print paper in a continuous operation. FIGURE 2 is an exploded view of a laminate made in accordance with prior art practice, and FIGURE 3 is an exploded view of a laminate made in accordance with the present invention.

The resins used for impregnating the cores of laminates made in accordance with this invention can be any of those thermosetting resins conventionally used in the production of laminates. The most common of these resins is a condensation product of a phenol and an aldehyde and generally an alkaline catalyzed phenol-formaldehyde condensation product. However, the core stock of the invention may be varied in accordance with the particular properties desired and the manner of preparation of the core both as to the composition of the core itself and the impregnating resin is not considered a critical part of this invention.

The resin for impregnating and coating the surface of the present laminates is preferably a condensation product of melamine and an aldehyde because of the excellent wear properties of these resins, their translucency and resistance to discoloring. However, resins prepared from other aminotrazines, urea, dicyandiamide, light, highly purified phenolic resins, polyester resins, such as the unsaturated alkyd-vinyl monomer types, acrylics, cross-linked linear resins, ethoxyline resins, etc. may also be used. Among the melamine resins which can be used, several are more fully described in U.S. Patent 2,605.205, issued July 29, 1952.

An example of a particular melamine surface impregnating resin useful in connection with this is a modified melamine-formaldehyde reaction product produced by the American Cyanamid Company and sold under the name Cymel 428. This resin is a white, free-flowing powder, specifically designed for the treatment of paper to be used in decorative laminates. The resin is readily soluble in water or in alcohol-water solvents and gives a clear, colorless solution which is stable at 50% solids content for at least two days at room temperature. Typical properties of a 50% aqueous solution of this resin at 25° C. include a pH of 8.8 to 9.6, a Gardner viscosity of A to B, a solids at maximum dilution in water of 26% and a solids content at maximum dilution in water of 26%.

A phenolic resin which may be used in connection with the present invention is a light colored, thermosetting, general purpose phenol-formaldehyde resin sold by the Monsanto Chemical Company under the name of Resinox 470.

A typical polyester which can be used for coating the print sheet is a general purpose, thermosetting resin made by reacting two moles of propylene glycol, one mole of maleic anhydride and one mole of phthalic anhydride, 70 parts of such polyester being copolymerized with 30 parts of styrene.

The silica used in connection with the present invention is finely divided, pure white silica flour produced by the Pennsylvania Pulverizing Company, Pittsburgh, Pa., and sold under the names 30 Micron Min-U-Sil and Opal Silica. These silicas are substantially pure silicon oxide. In a typical 30 Micron Min-U-Sil silica, 97% by weight has a particle size of less than 30 microns, with an average particle size of 3 microns and substantially no particles of a size over 40 microns. The color (reflectance) is 83.5 and the surface area 5400 cm.$^2$/gram. The pH is 7.0, the bulk density 63.0 lb./cu. ft. and the iron content expressed as $Fe_2O_3$ is 230 parts per million. A typical Opal Silica has a particle size of 0.9 plus 325 mesh and the color (reflectance) is 83.5. About 99.3% by weight of the Opal Silica is finer than 43 microns and the average particle size is about 11.9 microns. The surface area of this material is 7300 cm.$^2$/gram and the pH is 7.0. The bulk density of the material is 68.6 lb./cu. ft. and the iron content expressed as $Fe_2O_3$ is 190 parts per million. Still another useful silica produced by the same company is 25 Micron Silica having an average particle size of 7.2 microns and substantially no particles larger in size than 30 microns. Mixtures of such silicas are also used.

Generally speaking, finely divided silica substantially free of extraneous color is useful in connection with the present invention. Natural occurring silica in the form of silica flour has been found to give excellent results. The maximum particle size of the silica is generally limited by processing rather than product considerations, silicas having particles ranging in size up to about 40 microns with an average size of five to ten microns being preferred. No advantage seems to accrue from the use of very fine particle silicas, as for example, the silica aerogels. The particle size of the silica will depend on the amount of abrasion resistance desired on the laminate surface and the processing limitations. Amounts of silica greater than about 30 parts, by weight, per 100 parts of resin solids introduce a problem of haze. As little as 5 parts has a beneficial effect on wear resistance.

The microcrystalline cellulose used in connection with this invention is produced by the severe acid hydrolysis of pure cellulosic fibers which removes the amorphous constituents of the fibers, leaving only microcrystals which are freed from their fibrous structure by shear mixing. A typical material of this type is sold by the American Viscose Corporation as Avirin and Avicel and the specific method of its preparation is well known, being set forth, for example, in Industrial and Engineering Chemistry, volume 54, No. 9, September 1962, pages 20 through 29 in the patent and other literature including Patent 2,978,-446 issued Apr. 4, 1961. The so-called microcrystalline material of the present invention is available in the form of a uniformly pure flour of colloidal size and in the form of very tiny flakes. It is essentially a mechnically disintegrated form of level-off D.P. or $\overline{D.P.}$ cellulose described in the above article and patent. The material can be easily gelled by mixing with water, particularly in a high shear blender. The material is not a fiber in either its dry or gelled form. At low microscopic magnification levels, the material before any processing does in fact appear similar to fiber fragments such as are produced when cellulose flock is ground. However, upon additional magnification it is found that ground cellulose flock is fibrous in every sense of the word but, on the other hand, the present microcrystalline material is a series of re-agglomerated microcrystals having finite pores of the range of about 20 to 50 angstrom units between them. This porosity is shown by oil absorption studies wherein the present microcrystalline materials absorb many times the amount of oil absorbed by ground cellulose of similar particle size. Microscopic comparison of the present microcrystalline material and cellulosic flock such as the flock of the above mentioned copending application indicates that whereas the prior art flock tends to agglomerate in a liquid, the present microcrystalline material does not. Furthermore, the flock is fibrillated whereas the present microcrystalline materials are smooth in appearance.

The wet tack of the present materials is reduced, and the processing of the laminates accordingly facilitated, by the optional inclusion of a water-soluble thickening agent which is nonreactive with the other ingredients of the coated composition and which does not gel during formulation. A very useful material of this type is sodium carboxy methyl cellulose, although other gummy materials, such as gum arabic, and thickening agents, such as methyl cellulose, polyvinyl alcohol and others which will occur to those skilled in the art, may be used. This wet tack reducing material can be omitted if desired.

The following examples will illustrate the practice of the invention, it being realized that such examples are typical only of the many facets and variations of the invention. All parts and percentages are by weight.

*Example 1*

A coating composition was prepared by mixing together for about one minute in a high shear blender, such as a Cowless blender, 64 parts of water, 12.5 parts of sodium carboxy methyl cellulose in 2% concentration and 10 parts of finely divided silica. There was added to the above mix 100 parts of Cymel 428, melamine resin and the mixture again blended to a homogeneous mix for about 2 minutes. There was then added 10 parts of Avirin microcrystalline cellulose with thorough mixing.

The core stock of the laminate was prepared from eight sheets of 11 mil kraft paper impregnated with a 50% solution of standard alkaline catalyzed phenol-formaldehyde laminating resin with the final resin solids content of the core stock of the above 40% of the total weight of the core. The sheets were oven dried after impregnation for a period of from one to two minutes at a temperature of from about 140° to 170° C.

The process of impregnating and coating the print sheet will be better understood by referring to the drawing. Referring to FIGURE 1, the untreated print paper 1 consists of a continuous roll or web of suitable printed alpha cellulose paper. The print paper is impregnated with a 50% solids water solution 2 of the melamine resin used in the coating composition set forth above. The print paper is impregnated to a dry resin content typically of between about 33% and 43%. This impregnated paper, while still wet, should not have an excess of solution on the surface for such excess solution causes difficulty in coating. For this reason the impregnated print paper is passed between the nip of rolls 3 and 4 to remove resin in excess of the above 33% to 42% resin content.

The coating composition 5 prepared as above is then applied to the wet surface of the now impregnated print paper 1 by means of a knife coater placed above the top roll 4. The coating solution is fed to the top of roll 4 by means of a feeder tube 7 which preferably transverses the width of the sheet.

The impregnated and coated print paper is passed through a forced air drying oven (not shown) containing a conveyor to support the web at a temperature of from about 140° C. to 170° C. for from about 3 to 5 minutes. The weight of the dry coating is typically from about 0.022 to 0.33 lb./sq. ft. of print sheet and the volatile content of the dried print sheet should be in the range of from about 2% to 5% and preferably from about 2% to 3%. The core and print sheets are then cut to size and the coated print sheet is placed above the eight sheets of core stock and the coated and impregnated sheets are laminated between polished stainless steel or other suitable panels under heat and pressure in conventional well-known laminating fashion. Times of laminating will ordinarily vary from about 20 to 25 minutes. The temperature will vary from about 130° C. to 150° C. and the pressure from 1000 to 1,500 p.s.i. The laminates are cooled while still under pressure to below 40° C. and removed from the press. FIGURES 2 and 3 illustrate exploded views of the laminates of the prior art and of this invention respectively. Referring to FIGURE 2, it can be seen that the core 8 comprises eight sheets. Print sheet 9 is between overlay sheet 10 and core 8. In FIGURE 3 illustrating a typical laminate of the present invention, core 11 is identical to core 8 of FIGURE 2. Print sheet 12, however, forms the top lamina and there is no overlay sheet above the print sheet. Instead, the surface of print sheet 12 is coated with the coated composition of this invention consisting of resin microcrystalline cellulose and silica and this coating 13 forms the surface of the laminate.

Example 1 was repeated in every detail except that varying amounts of microcrystalline cellulose were used including 20 parts (Example 2), 30 parts (Example 3), 40 parts (Example 4), and 50 parts (Example 5) of such microcrystalline cellulose per 100 parts of melamine resin.

Abrasion cycle and abrasion rate tests were performed on the above laminates in accordance with the standards of the National Electrical Manufacturers Association (NEMA), test LP2–1.06. Abrasion cycles are the number of cycles or revolutions of an abrasive covered wheel in contact with the test sample necessary for breakthrough to occur. Abrasion rate is a measure of the number of grams of sample abraded off per 100 revolutions. The NEMA standard specification for minimum wear value (Abrasion cycles) is 400. The NEMA specification for maximum abrasion rate is 0.08 gram per 100 revolutions. Standard laminates having a melamine resin surface seldom have a wear value of over 500, with 550 being considered exceptional. The abrasion rates of standard laminates with melamine resin are rarely below 0.060 to 0.065. The results of such tests, along with the viscosity in centipoises at 30° C., the film thickness of the composition as coated and the relative cigarette resistance according to NEMA standard LP2–2.04 of the various materials made according to this invention are shown in the following table.

TABLE

| Ex. | Parts Microcrystalline, cellulose/100 parts resin | Mix Viscosity Centipoises at 30° C. | Relative Cigarette Resistance | Abrasion, cycles | Abrasion Rate, G./100 rev. | Film Thickness (mils) |
| --- | --- | --- | --- | --- | --- | --- |
| 1 | 10 | 2,000 | 154 | 530 | .027 | 1.0 |
| 2 | 20 | 4,000 | 137 | 890 | .027 | 1.3 |
| 3 | 30 | 12,000 | 174 | 1,010 | .022 | 1.8 |
| 4 | 40 | 45,000 | 140 | 1,000 | .028 | 2.2 |
| 5 | 50 | 60,000 | 130 | 1,400 | .021 | 2.6 |

From the above it will be evident that there are provided by the present invention surface coatings for laminates which are possessed of salutary abrasion resistance.

When materials made according to the above examples were brushed with an abrasive-containing nylon web belt such as that sold by Minnesota Mining & Manufacturing Co. as "Scotchbrite" it was found that there was no mottling or objectionable variation in reflection of the surfaces of the material such as is obtained when the prior art fibrous material is used.

It has been found that the salutary results of the present invention are arrived at when from about 10 to 50 parts of the present microcrystalline material are used for each 100 parts of resin. When less than about 10 parts of the microcrystalline material is used for each 100 parts of resin, little or no reinforcement of the surface is attained. Additionally, surfaces made with resins containing such low amounts of microcrystalline material tend to craze and the viscosity of the resin-treating solution is so low that not enough resin remains in the surface. On the other hand, when more than about 50 parts of the microcrystalline material is used for 100 parts of resin, the surfacing composition becomes so viscous that the laminate cannot be conveniently coated and there is not retained in the surface enough resin to give the proper thickness for abrasion resistance.

In addition to the lack of mottle and good abrasion resistance obtained with surface coating compositions of the present invention, such coating compositions devoid of impurities provide an extremely clear surface coating so that when decorative print layers are used there is little or no loss in decorative effect through the use of the surface coating composition. Additionally, the stain resistance of laminates made according to the present invention is very good and coating compositions made according to the present invention are more resistant to chemical attack than when the previous cellulosisc fibers are used.

What I claim as new and desire to secure by Letters Patent of the United States is:

1. An abrasion-resistant decorative laminate comprising a core and a single surface lamina positioned thereover, said surface lamina comprising a print sheet coated with a composition comprising (1) 100 parts by weight of a thermosetting resin, (2) from about 5 to about 30 parts by weight of silica flour, (3) from about 10 to about 50 parts by weight of microcrystalline cellulose having a refractive index approximating that of the cured thermosetting resin said microcrystalline cellulose being mechanically disintegrated level-off D.P. cellulose, and (4) up to about 3% of sodium carboxymethyl cellulose, said composition being clear and highly translucent in its cured condition.

2. An abrasion-resistant decorative laminate comprising a core and a single surface lamina positioned thereover, said surface lamina comprising a print sheet impregnated with a thermosetting resin and coated with a composition comprising (1) 100 parts by weight of a melamine aldehyde resin, (2) from about 5 to about 30 parts by weight of silica flour, (3) from about 10 to about 50 parts by weight of microcrystalline cellulose having a refractive index approximating that of the cured melamine aldehyde resin said microcrystalline cellulose being mechanically disintegrated level-off D.P. cellulose, and (4) up to about 3% of a water-soluble thickening agent, said composition being clear and highly translucent in its cured condition.

3. An abrasion-resistant decorative laminate comprising a core and a single surface lamina positioned thereover, said surface lamina comprising a print sheet coated with a composition comprising (1) 100 parts by weight of a thermosetting resin, (2) from about 5 to about 30 parts by weight of silica flour, and (3) from about 10 to about 50 parts by weight of microcrystalline cellulose having a refractive index approximating that of the cured thermosetting resin, said microcrystalline cellulose being mechanically disintegrated level-off D.P. cellulose, said composition being clear and highly translucent in its cured condition.

4. An abrasion-resistant laminate as in claim 3 wherein said thermosetting resin is melamine aldehyde resin.

References Cited

UNITED STATES PATENTS

| | | | |
| --- | --- | --- | --- |
| 2,978,446 | 4/1961 | Battista et al. | 260—212 |
| 3,259,537 | 7/1966 | Battista | 161—267 |
| 2,335,126 | 11/1942 | Lilienfeld | 117—139.5 |
| 3,135,643 | 6/1964 | Michl | 161—79 |

EARL M. BERGERT, *Primary Examiner.*

R. I. SMITH, M. L. KATZ, *Assistant Examiners.*